(12) United States Patent
Yamaguchi et al.

(10) Patent No.: US 6,688,339 B2
(45) Date of Patent: Feb. 10, 2004

(54) COMPOSITE HIGH-PRESSURE TUBE AND METHOD OF MANUFACTURING THE TUBE

(75) Inventors: Koji Yamaguchi, Kyoto (JP); Katsuo Matsuzaka, Kyoto (JP); Takehiro Yamada, Kyoto (JP); Koichi Adachi, Kyoto (JP); Mitsuhide Nogami, Tokyo (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 10/362,908

(22) PCT Filed: Aug. 27, 2001

(86) PCT No.: PCT/JP01/07330

§ 371 (c)(1),
(2), (4) Date: Feb. 27, 2003

(87) PCT Pub. No.: WO02/18832

PCT Pub. Date: Mar. 7, 2002

(65) Prior Publication Data

US 2003/0178082 A1 Sep. 25, 2003

(30) Foreign Application Priority Data

Aug. 29, 2000 (JP) ......................................... 2000-259605

(51) Int. Cl.⁷ ................................................. F16L 11/00
(52) U.S. Cl. ........................ 138/129; 138/137; 138/140; 138/130; 138/144
(58) Field of Search ................................ 138/137, 140, 138/141, 129, 130, 144, 154

(56) References Cited

U.S. PATENT DOCUMENTS 4,264,672 A * 4/1981 Taylor-Brown et al. ..... 428/339
5,261,462 A * 11/1993 Wolfe et al. ................. 138/130
5,612,104 A * 3/1997 Grund ........................ 428/34.8
5,614,297 A * 3/1997 Velazquez ................... 428/212

FOREIGN PATENT DOCUMENTS

| JP | 8-247348 | 9/1996 |
| JP | 2000-179758 | 6/2000 |

* cited by examiner

Primary Examiner—Patrick Brinson
(74) Attorney, Agent, or Firm—Armstrong, Kratz, Quintos, Hanson & Brooks, LLP

(57) ABSTRACT

A high-pressure composite pipe of the present invention comprises an inner layer pipe made of a synthetic resin, and a reinforcing layer formed by spirally winding a stretched polyolefin resin sheet on an external circumferential surface of the inner layer pipe. The synthetic resin for the inner layer pipe or a heat-sealable resin is filled into a gap defined by the stretched polyolefin resin sheet, thereby avoiding penetration of water from a cut surface of the pipe.

A method of the present invention for manufacturing a high-pressure composite pipe comprises the steps of: manufacturing an inner layer pipe made of a synthetic resin; spirally winding a stretched polyolefin resin sheet on an external circumferential surface of the inner layer pipe; filling the synthetic resin for the inner layer pipe, in a melted state, into a gap defined by the stretched polyolefin resin sheet, wherein the stretched polyolefin resin sheet is heated in the wound state so as to generate a shrinkage stress in the stretched polyolefin resin sheet; and fusing the stretched polyolefin resin sheet and the inner layer pipe together.

15 Claims, 8 Drawing Sheets

High-pressure composite pipe

COMPOSITE HIGH-PRESSURE TUBE AND METHOD OF MANUFACTURING THE TUBE

TECHNICAL FIELD

The present invention relates to high-pressure composite pipes to be used as high pressure pipes or hoses which require a high strength against internal pressure, and also relates to a method for manufacturing the same.

BACKGROUND ART

Conventionally, high pressure pipes for transporting water, gas and like medium are served by steel pipes or resin pipes such as rigid polyvinyl chloride pipes and polyethylene pipes.

While steel pipes exhibit a high strength against internal pressure and an excellent creep resistance, they are deficient in having a poor earthquake resistance and developing rust and corrosion. Therefore, the recent trend is to employ synthetic resin pipes such as rigid polyvinyl chloride pipes and polyethylene pipes, or to use reinforced composite pipes. In particular, use of reinforced composite pipes has increased because of their superior rust resistance, corrosion resistance, pressure resistance, etc.

Reinforcements include metal fibers, glass fibers, carbon fibers, synthetic resin fibers, stretch-formed synthetic resin fibers, fiber bundles or braids of these fibers, and strips or stretch-formed strips of these fibers. To show their reinforcing effects, these reinforcements are arranged as an intermediate layer within the pipe wall layer of a synthetic resin pipe, or they are laminated on the outer layer or the inner layer.

Japanese Patent Laid-open Publication No. H10-19170 proposes an example of the reinforced high-pressure pipe. A reinforcing layer is formed by winding plural layers of metal sheets (steel strips) on the external circumferential surface of a synthetic resin pipe (an inner layer). In addition, a corrosion-resistant layer and a foamed layer (outer layers) are laminated on the external circumferential surface of the reinforcing layer. This high-pressure composite pipe is enhanced in pressure resistance against internal hydraulic pressure and also in pressure-resistant creep property.

This high-pressure composite pipe, however, is inferior in adhesive property (interface adhesion) between the reinforcing layer (the metal sheet) and the synthetic resin for the inner layer. Due to such deficiency, when the pipe is cut, the pipe may yield to water pressure on the pipe end. Then, water penetrates from the cut surface through between the reinforcing layer and the synthetic resin layer (i.e. inner layer) and causes weeping or so-called blister (bubbles of water generate on the surface of the reinforcing layer). In the end, contents may leak out of the pipe or block the pipe.

Therefore, with regard to the cutting and connection of the conventional high-pressure composite pipes, it is necessary to apply an adhesive to the widthwise end of each pipe or to remove the reinforcing layer at the connection part, before the pipes are connected. This preparation requires sophisticated work skills and higher working costs.

The present invention has been made to solve these problems. An object of the present invention is to provide high-pressure composite pipes which neither experience weeping due to penetration of water from a cut surface of the pipe nor suffer from fracture by blister, and which have a superior pressure resistance strength. Another object of the present invention is to provide a method for manufacturing these high-pressure composite pipes.

DISCLOSURE OF THE INVENTION

A high-pressure composite pipe of the present invention is characterized in comprising an inner layer pipe made of a synthetic resin, and a reinforcing layer formed by spirally winding a stretched polyolefin resin sheet on an external circumferential surface of the inner layer pipe, wherein the inner layer pipe and the stretched polyolefin resin sheet are fused together, and wherein the synthetic resin for the inner layer pipe is filled into a gap defined by the stretched polyolefin resin sheet which is wound on the external circumferential surface of the inner layer pipe.

In the context of the present invention, the gap defined by the stretched polyolefin resin sheet (the gap in the stretched polyolefin resin sheet) means, in principle, a spiral gap which is created between widthwise ends of adjacent turns of the polyolefin resin sheet, when the stretched polyolefin resin sheet is wound as the reinforcing layer on the external circumferential surface of the inner layer pipe.

Additionally, in the case where the stretched polyolefin resin sheet is wound in a plurality of layers, the gap in the stretched polyolefin resin sheet may include a gap which is created between a sheet layer contacting the inner layer pipe and another sheet layer overlying the former sheet layer (when an outer layer is coated, the term may also include a gap created between a sheet layer contacting the outer layer and another sheet layer underlying the former sheet layer) Besides, when the stretched polyolefin resin sheet is spirally wound such that its widthwise ends overlap on one another, the gap in the stretched polyolefin resin sheet may further refer to a gap which is created in the vicinity of the overlapping portion.

According to the high-pressure composite pipe of the present invention, the reinforcing layer made of a stretched polyolefin resin sheet is wound and laminated on an external circumferential surface of the inner layer pipe made of a thermoplastic resin. In this process, the inner layer pipe and the stretched polyolefin resin sheet are integrally fused together by heating.

At this stage, the heating temperature is raised to the neighborhood of the melting point of the synthetic resin for the inner layer pipe, so that the surface of the inner layer pipe can melt. Besides, the heat causes the stretched polyolefin resin sheet to shrink and generate a surface pressure. As a result, the resin for the inner layer pipe (the melted resin on the surface) is embedded into the gap in the stretched polyolefin resin sheet (the spiral gap between the sheet ends).

Thus, the high-pressure composite pipe of the present invention avoids penetration of water from a cut surface of the pipe, thereby preventing weeping or fracture by blister.

To give a specific example of the high-pressure composite pipe of the present invention, the inner layer pipe may be composed of a plurality of synthetic resin layers. A synthetic resin for at least the outermost layer of this inner layer pipe is filled into the gap in the stretched polyolefin resin sheet.

According to this structure, while the reinforcing layer made of the stretched polyolefin resin sheet is integrated with the inner layer pipe under heating, the outermost layer of the inner layer pipe swells and exudes into the gap in the stretched polyolefin resin sheet more effectively. Therefore, the synthetic resin for the inner layer pipe can be filled in a better condition.

If the inner layer pipe has a plurality of synthetic resin layers, these layers may be made of the same resin or different resins. For example, a polyethylene inner layer pipe may be constituted with an innermost layer of HDPE (high-density polyethylene), a middle layer of LLDPE (linear low-density polyethylene), and an outermost layer of LDPE (low-density polyethylene). To give another example, where an inner layer pipe is made of a polypropylene innermost layer and a polyamide outermost layer, an acid-modified middle layer may be provided between these layers in order to impart adhesive property.

In a preferable high-pressure composite pipe of the present invention, when the inner layer pipe has a plurality of synthetic resin layers, a synthetic resin for at least the outermost layer has a melt index (according to JIS K 6760) of 2 g/10 min or greater (including 2 g/10 min).

A synthetic resin with a high melt index, which is a synthetic resin showing high fluidity, enables the synthetic resin for the inner layer pipe to exude readily into the gap in the stretched polyolefin resin sheet. Hence, the synthetic resin can be embedded into the gap in a better condition. In the following description, the term "melt index" is mentioned as MI.

Concerning the above high-pressure composite pipe of the present invention, when the reinforcing layer made of the stretched polyolefin resin sheet is integrated with the inner layer pipe under heating, the stretched polyolefin resin sheet shrinks to cause exudation of the synthetic resin for the inner layer pipe. Accordingly, if the inner layer pipe has a plurality of layers made of two or more types of synthetic resins, the layers in the inner layer pipe are arranged to have different MIs from each other, with the outermost layer having the highest MI. This arrangement enables the resin for the outermost layer to exude more readily. In a desirable case, the synthetic resin for each layer is a polyolefin resin, and the synthetic resin for the outermost layer has a MI of 0.1 g/10 min or greater, or preferably about 1.0 to 30.0 g/10 min, in view of the actual pipe forming.

In a preferable high-pressure composite pipe of the present invention, when the inner layer pipe has a plurality of synthetic resin layers, a melting point of a synthetic resin for at least the outermost layer is lower than that of at least one of the synthetic resins for the other layer or layers. The difference of the melting temperatures is 5° C. or greater (including 5° C.)

Where the outermost layer of the inner layer pipe has a lower melting temperature, it is possible to reduce the heating temperature for integrating the inner layer pipe with the reinforcing layer made of the stretched polyolefin resin sheet, while ensuring a sufficient adhesive property between the inner layer pipe and the stretched polyolefin resin sheet. Hence, the integration can be achieved by a low-temperature heating treatment, which suppresses stress relaxation in the stretched polyolefin resin sheet. Besides, the pipe can be protected against deformation or diametrical contraction due to the shrinkage stress of the sheet. Further, the low-temperature heating treatment results in energy saving.

As for a preferable inner layer having a plurality of layers, the main layer is made of a resin with an excellent creep property, and the outermost layer is made of a resin which is suitably embedded into the sheet gap (a resin with a low melting point and/or a high MI).

In a preferable high-pressure composite pipe of the present invention, the stretched polyolefin resin sheet which constitutes the reinforcing layer shows a shrinkage stress of 4.9 MPa or greater (including 4.9 MPa), when heated.

When the stretched polyolefin resin sheet shows a higher percentage of thermal shrinkage, the stretched polyolefin resin sheet generates a greater shrinkage stress, as a result of the heating treatment for integrating the inner layer pipe with the reinforcing layer made of the stretched polyolefin resin sheet. In turn, this shrinkage stress causes generation of a remarkably high surface pressure between the inner layer pipe and the stretched polyolefin resin sheet. Eventually, the synthetic resin for the inner layer pipe can exude more readily into the gap in the stretched polyolefin resin sheet.

In this regard, a proper range of the shrinkage stress is from 4.9 to 15 MPa, because an excessive shrinkage stress of the stretched polyolefin resin sheet severely affects variations of the outer diameter in the forming process of the high-pressure composite pipe. The shrinkage stress is meant to be measured at the temperature for filling the resin for the inner layer pipe into the gap in the stretched polyolefin resin sheet.

In the high-pressure composite pipe of the present invention, a heat-sealable resin may be filled into the gap defined by the stretched polyolefin resin sheet which is wound on the external circumferential surface of the inner layer pipe.

Owing to the heat-sealable resin which fills the gap defined by the stretched polyolefin resin sheet, the high-pressure composite pipe of this invention can avoid penetration of water from a cut surface of the pipe, thereby preventing weeping or fracture by blister. Further, the heat-sealable resin can fuse the inner layer pipe (and the outer layer) and the stretched polyolefin resin sheet, without leaving a gap at the interface.

In the high-pressure composite pipe of the present invention, an outer layer made of a synthetic resin may be laminated on the external circumferential surface of the reinforcing layer. Where the outer layer is provided on the external circumferential surface of the reinforcing layer, the synthetic resin for the outer layer is filled into the gap defined by the stretched polyolefin resin sheet which lies below the outer layer. This arrangement avoids penetration of water from a cut surface of the pipe.

In a preferable high-pressure composite pipe of the present invention, the stretched polyolefin resin sheet is crosslinked.

Hereinafter, each part of the high-pressure composite pipe is described in detail.

Stretched Polyolefin Resin Sheet

The following description relates to the stretched polyolefin resin sheet which constitutes the reinforcing layer of the high-pressure composite pipe.

The term "stretched polyolefin resin sheet" refers to a resin sheet which is stretched at least in the longitudinal direction and whose material is mainly composed of a polyolefin resin.

The polyolefin resin is not particularly limited, as far as the tensile modulus (Young's modulus) increases after stretching. For example, there may be mentioned low-density polyethylenes, linear low-density polyethylenes, high-density poly-ethylenes, homopolypropylenes, propylene random copolymers, propylene block copolymers, poly (4-methyl-1-pentene), etc. Among these polyolefin resins, high-density polyethylenes are preferred for their crosslinking ability and high tensile modulus after stretching. An ethylene/α-olefin copolymer is preferable as well. The side chain may be propylene, 1-hexene or 1-butene, of which 1-butene is particularly preferred.

In consideration of recyclability as well as productivity in extrusion forming or the like, it is preferable to employ a polyolefin with a molecular weight of 100,000 to 500,000.

Where necessary, polyolefin resins may be mixed with crystal nucleating agents, crosslinking agents, crosslinking aids, slipping agents, fillers, pigments, other types of polyolefin resins, low-molecular-weight polyolefin waxes, etc.

The crystal nucleating agent is added for the purpose of improving the degree of crystallization. The examples include calcium carbonate, titanium oxide, etc.

The crosslinking agent and the crosslinking aid are incorporated for partial crosslinking of molecular chains in the above-mentioned polyolefin resins, with an intention of improving the heat resistance, creep property, etc. of the stretched polyolefin resin sheet. Examples of the crosslinking agent include photopolymerization initiators such as benzophenone, thioxanthone, and acetophenone. Examples of the crosslinking aid are polyfunctional monomers such as triallyl cyanurate, trimethylolpropane triacrylate, and diallyl phthalate.

The photopolymerization initiator can be added in any amount, without particular limitation.

The addition can be made such that the crosslinking density of the stretched polyolefin resin sheet as well as the molecular weight and the gel fraction of the crosslinked resin can take predetermined values, and also in consideration of the influence of polymerization inhibition by oxygen during photopolymerization. The preferable gel fraction ranges from 20 to 70%. If the gel fraction is lower than 20%, the crosslinking effect is reduced. On the other hand, if the gel fraction is higher than 70%, the resulting sheet shows a less adhesion strength after the fusion, and is difficult to recycle.

In addition to the use of these crosslinking agents, electron ray or ultraviolet ray may be irradiated as a crosslinking method.

The crosslinking method by electron irradiation or ultraviolet irradiation includes a process of irradiating an electron ray (preferably 1 to 20 Mrad, more preferably 3 to 10 Mrad) or irradiating an ultraviolet ray (preferably 50 to 800 mW/cm$^2$, more preferably 100 to 500 mW/cm$^2$). Either irradiation is carried out after the polyolefin resin is blended with the crosslinking agent, the crosslinking aids, and the others as mentioned above.

The stretched polyolefin resin sheet is obtained by stretching a polyolefin resin sheet processed in sheet form. The manner of preparing this polyolefin resin sheet is not particularly limited. Extrusion forming by T-die method and roll forming by calender method can be named as such.

In addition, there is no particular limitation to the manner of continuously stretching the polyolefin resin sheet. By way of illustration, a heated polyolefin resin sheet is carried along a number of rolls whose rotating speeds are set to increase successively, so that the sheet can be gradually stretched between the respective rolls. Alterntively, a heated polyolefin resin sheet is pulled through rolls rotating in opposite directions, so that the sheet can be stretched in the longitudinal direction of a pipe, with the thickness being decreased (so-called rolling method).

With respect to these stretching methods, one of them may be conducted only once by itself, or may be repeated more than once and step by step. If the stretching step is effected more than once, plural stretching methods may be combined. Particularly when the polyolefin resin sheet to be stretched is relatively thick, it is preferable to roll the sheet in the above manner and to stretch it thereafter.

The thickness of a polyolefin resin sheet to be stretched (a raw sheet material) is dependent on the use of the resulting high-pressure composite pipe, the stretch ratio, etc. Although the thickness is not particularly limited, a preferable thickness is about 0.5 to 15 mm. With a sheet thickness of less than 0.5 mm, the stretched polyolefin resin sheet is so thin as to sacrifice its handlability and complicate the subsequent operations (e.g. laminating operation). On the other hand, a sheet with a thickness over 15 mm generates an excessive stretching load. Such a thick sheet not only requires a needlessly large stretching machine but also complicates the stretching operation. The above-defined raw sheet material provides a stretched polyolefin resin sheet with a thickness of about 50 to 1000 μm.

The width of the reinforcing layer made of the stretched polyolefin resin sheet is adequately selected, without particular limitation, according to the diameter of the high-pressure composite pipe, the winding angle of the sheet, and the winding process to be mentioned below. Where the reinforcing layer is constituted with a sheet in a relatively narrow width, a broad sheet may be slit into a required width.

The stretch ratio of the stretched polyolefin resin sheet is decided, as necessary, based on the properties and state of the crystalline polyolefin resin used therefor. Although this ratio is not strictly specified, a preferred stretch ratio is not less than 1000%, more preferably not less than 1500%, in the longitudinal direction of the sheet. At a longitudinal stretch ratio of less than 1000%, the stretched polyolefin resin sheet may fail to obtain a strength and a tensile modulus as required. Incidentally, the sheet may be a biaxially oriented sheet which is stretched in the width direction as well as the longitudinal direction. However, widthwise stretching hampers longitudinal stretching, so that it may be difficult to stretch the sheet in the longitudinal direction at 1000% or higher.

Where necessary, in order to enhance the adhesive property, the surface of the stretched polyolefin resin sheet may be treated by a physical or chemical method.

An example of the surface treatment is to create a microscopically uneven surface on the stretched polyolefin resin sheet, by an embossing means such as sand blasting or by a local surface heating means. This physical surface treatment is preferred in terms of simple operability.

The heating of the stretched polyolefin resin sheet is preferably effected on the surface by a local heating means. Such heating treatment can fuse the surface layer of the stretched polyolefin resin sheet, without fusing its internal part. Hence, molecular orientation is relaxed only at the surface, whereas molecules in the internal part remain oriented. In this sheet, the fusion temperature is lower in the surface layer than in the internal part, which results in an increase of the adhesive property.

As another manner of increasing the adhesive property between the inner layer pipe (and the outer layer) and the reinforcing layer, an adhesive polyolefin resin film (a heat-sealable resin film) may be laminated, in advance, on a surface of the stretched polyolefin resin sheet. Resins for the adhesive polyolefin resin film include, for example, linear low-density polyethylenes, modified polyethylenes, ethylene-vinyl acetate copolymers and the like.

By crosslinking the stretched polyolefin resin sheet in the above-mentioned manners, the stretched polyolefin resin sheet is imparted with an improved creep property, which enhances the creep property against internal pressure when the high-pressure composite pipe is in service. Therefore, particularly when the polyolefin resin for the inner layer pipe has a poor creep property, it is desirable to crosslink the stretched polyolefin resin sheet.

As a result of the stretching and crosslinking of the polyolefin resin sheet, its melting temperature becomes higher than that of the resin for the inner layer pipe (and the outer layer) which is an uncrosslinked polyolefin resin. As far as the stretch ratio and the gel fraction fall within the above ranges, the melting temperature of the crosslinked, stretched polyolefin resin sheet is usually about 3 to 25° C. higher than the melting temperature of the resin for the inner layer pipe (and the outer layer) which is an uncrosslinked polyolefin resin. Consequently, the range of the heating temperature can be easily controlled during the manufacture of the high-pressure composite pipe. Besides, the polyolefin resin sheet itself does not melt in this condition.

Regarding the melting temperatures of the crosslinked, stretched polyolefin resin sheet and the resin for the inner layer pipe (and the outer layer), adverse affects are anticipated in the following cases.

Firstly, if the difference of their melting temperatures is less than 3° C., the stretched polyolefin resin sheet may melt, when the fusion temperature in the fusing step slightly exceeds the melting temperature of the resin for the inner layer pipe (and the outer layer), which is a polyolefin resin. Therefore, there is a requirement for highly precise temperature control, which results in a cost rise. In contrast, when the difference of their melting temperatures is greater than 25° C., temperature control is actually facilitated. However, the melting temperature of the resin for the inner layer pipe (and the outer layer), which is a polyolefin resin, differs too widely from the temperature at which the stretched polyolefin resin sheet can generate a required shrinkage stress. Consequently, the stretched polyolefin resin sheet fails to exhibit a sufficient shrinkage stress, whereby the melted resin for the inner layer pipe (and the outer layer) cannot be filled into the gap in the stretched polyolefin resin sheet.

Incidentally, with regard to the order of the stretching process and the crosslinking process for the polyolefin resin sheet, it is generally difficult to stretch a crosslinked polyolefin resin sheet. Therefore, in view of the ease of stretching and the storage stability of the stretched polyolefin resin sheet after the stretching process, it is preferable to perform the stretching process and the crosslinking process at the same time, or to perform the crosslinking process after the stretching process.

The polyolefin resin sheet is wound spirally on the external circumferential surface of the inner layer pipe, at a predetermined angle relative to the axis of the pipe. Where necessary, a plurality of polyolefin resin sheets are wound such that the spiral direction of each sheet is oriented in the same or opposite direction relative to the other(s).

The winding angle (the angle of inclination) of the stretched polyolefin resin sheet is preferably in the range of 30 to 90 degrees, more preferably in the range of 45 to 70 degrees, relative to the axis of the high-pressure composite pipe.

The winding angle of the stretched polyolefin resin sheet can be selected appropriately. However, care should be taken when the stretched polyolefin resin sheet is laminated without a gap. In such a case, the angle is dependent on the sheet width relative to the cross-sectional configuration of the high-pressure composite pipe.

Manners for circumferentially laminating the stretched polyolefin resin sheet include, but not limited to, a so-called spiral winding process of winding the stretched polyolefin resin sheet at a desired angle, and a so-called braiding process of winding, in a braided manner, the stretched polyolefin resin sheets prepared in a relatively narrow width. A suitable manner can be selected in accordance with the conditions such as the amount of manufacture, the manufacturing speed and the diameter of the high-pressure composite pipe.

In the spiral winding process, a stretched polyolefin resin sheet is continuously wound on the inner layer pipe (serving as a mandrel) at a fixed angle relative to its axis. In the course of winding, turns of the stretched polyolefin resin sheet may be over-lapped or slightly spaced, as far as the performance of the high-pressure composite pipe is not impaired. To wind the stretched polyolefin resin sheet without a gap nor an overlap, the winding angle is decided according to the conditions such as the width of the stretched polyolefin resin sheet and the outer diameter of the inner layer pipe. Concerning the spiral winding process, the stretched polyolefin resin sheet preferably constitutes an even number of layers, rather than an odd number of layers, such that the layers are formed alternately at the same positive/negative angles relative to the axis of the high-pressure composite pipe.

As for the braiding process, a plurality of stretched polyolefin resin sheets with a relatively small width are wound in a braided manner. In terms of design, the resulting high-pressure composite pipe shows a substantially equivalent strength against internal pressure, in comparison with the pipe obtained by the spiral winding process.

Inner Layer Pipe

In the high-pressure composite pipe of the present invention, the inner layer pipe constitutes a passage for a transported medium. Therefore, the type of synthetic resin for the inner layer pipe is suitably selected in accordance with the type of transported medium.

Specific examples include, but not limited to, polyolefin resins similar to those employed for the stretched polyolefin resin sheet, polyvinyl chloride, polyamides, various rubbers, polyolefin elastomers, etc.

The wall thickness of the inner layer pipe is properly selected in accordance with the type of transported medium, the internal pressure during use or the intended application. For the purpose of recycling fragments of the high-pressure composite pipe produced during manufacture or recycling the high-pressure composite pipe after use, preferable synthetic resins for the inner layer pipe are polyolefin resins.

The inner layer pipe may be composed of a plurality of synthetic resin layers. A multilayer inner layer pipe can be obtained by a multilayer extrusion process using a multi-layered mold and a plurality of extruders. Alternatively, a multilayer inner layer pipe can be manufactured by extrusion-forming a pipe with the use of an extruder and a coating mold and then by extrusion-coating the pipe. If the forming temperatures of synthetic resins for multiple layers show an insignificant difference between each other, a multilayer extrusion process is preferred.

As a further way to make multiple layers as the inner layer, a heat-shrinkable synthetic resin tube may be covered on an inner layer, and attached closely or adhesively by heating.

Outer Layer

In order to protect the inner layer pipe and the reinforcing layer from external forces, the high-pressure composite pipe of the present invention may be laminated with an outer layer. The outer layer may be composed of a plurality of synthetic resins.

The resin for the outer layer is optionally selected in accordance with the intended application, the condition of use, and the like. In addition to the synthetic resins for the inner layer pipe, use can be made of polyamides, acrylic resins, polyester resins, etc. Similar to the inner layer pipe, the wall thickness of the outer layer is properly determined in accordance with the intended application, the condition of use, etc.

Additionally, for the purpose of recycling fragments of the high-pressure composite pipe produced during manufacture or recycling the high-pressure composite pipe after use, preferable synthetic resins for the outer layer are polyolefin resins. The synthetic resin for the outer layer may be the same as or different from the one employed for the inner layer pipe.

The outer layer can be laminated by extrusion forming. For extrusion forming of the outer layer, while an inner layer pipe on which the stretched polyolefin resin sheet is wound is carried through the cavity in a crosshead coating mold, the resin for the outer layer is extruded into the mold to give a coating. In order to achieve firm adhesion between the outer layer and the stretched polyolefin resin sheet, an adhesive layer may be co-extruded with the outer layer.

The above-mentioned manners for coating the outer layer are also applicable to formation of a synthetic resin layer, a heat-sealable resin layer or the like (to be described) which may be provided between the inner layer pipe and the stretched polyolefin resin sheet, between the stretched polyolefin resin sheets, or between the outer layer and the stretched polyolefin resin sheet.

Heat-sealable Resin

The following description relates to a heat-sealable resin.

Resins for the heat-sealable resin are not particularly limited, as far as being thermofusible and having a lower melting point than the stretched polyolefin resin sheet which constitutes the reinforcing layer. For example, there may be mentioned low-density polyethylenes, linear low-density polyethylenes, middle-density polyethylenes, modified polyethylenes and the like. It is also possible to use copolymers of these resin components with vinyl acetate, vinyl alcohol, vinyl chloride, acrylic acid, etc.

In the high-pressure composite pipe of the present invention, a heat-sealable resin film may be laminated on each surface of the stretched polyolefin resin sheet, so that the stretched polyolefin resin sheet can adhere to the inner layer pipe (and the outer layer) or to another stretched polyolefin resin sheet.

The laminating manner of the heat-sealable resin film includes a manner of pulling the stretched polyolefin resin sheet and the heat-sealable resin films through temperature-controlled pinch rolls at a predetermined speed.

Thus, both surfaces of the stretched polyolefin resin sheet are laminated with the heat-sealable resin films which have a properly set thickness. Accordingly, while heating is applied for the purpose of integrating the reinforcing layer with the inner layer pipe, the heat-sealable resin exudes into the gap in the stretched polyolefin resin sheet (the gap between the sheet ends). As a result, the inner layer pipe and the reinforcing layer can be integrated without a gap. In order to achieve good adhesion in the film lamination, it is preferable to fuse the stretched polyolefin resin sheet only at the surfaces, as mentioned previously.

If the heat-sealable resin is to fill the gap in the stretched polyolefin resin sheet, the heat-sealable resin film to be laminated on the stretched polyolefin resin sheet has, preferably, a thickness of 0.1 to 1 mm.

On the other hand, the heat-sealable resin film may concern only the adhesion between the inner layer pipe (and the outer layer) and the stretched polyolefin resin sheet, or the adhesion between the stretched polyolefin resin sheets. In this case, a preferable thickness of the heat-sealable resin film is 0.01 to 0.3 mm.

The heat-sealable resin is now described in greater detail.

The stretched polyolefin resin sheet is laminated with the heat-sealable resin film or films, as shown in FIGS. 12(a)–(d). In FIG. 12, the stretched polyolefin resin sheets are indicated at 501, and the heat-sealable resin films are shown at 502. Among the structures of FIGS. 12 (a)–(d), the structure of (d) is preferable for the ease of manufacture.

In a process of laminating the heat-sealable resin films on the stretched polyolefin resin sheet, the stretched polyolefin resin sheet and the heat-sealable resin films are fused temporarily. Then, the ends of the heat-sealable resin films are allowed to fuse and shrink, and eventually fused with the surfaces of the stretched polyolefin resin sheet. In order to increase the fusion strength between the stretched polyolefin resin sheet and the heat-sealable resin, this laminate may be further compressed between rolls which are heated above the melting point of the heat-sealable resin.

To effect the temporary fusion as mentioned above, the temperature of the stretched polyolefin resin sheet is controlled to not higher than its melting point. Thereafter, with the heat-sealable resin films being laid on both surfaces of the sheet, the stretched polyolefin resin sheet is compressed between the rolls. After the temporary fusion, the stretched polyolefin resin sheet is heated at or over the melting point of the heat-sealable resin. As a result, the heat-sealable resin films on the front and back surfaces are fused and shrink with respect to each other, and the heat-sealable resin films are also fused with the surfaces of the stretched polyolefin resin sheet.

The heat-sealable resin films may be heated with use of rolls, but preferably with use of an infrared furnace, a hot air generator or the like. Infrared heating is advantageous because the inner layer pipe can be fused at the same time.

Other Structures

In the present invention, the sectional configuration of the high-pressure composite pipe is not particularly limited. However, in terms of strength against internal pressure and external pressure relative to the weight, a circular section and a near-square section with rounded corners are efficient and thus preferred. A complex sectional configuration bothers lamination of the reinforcing layer.

The diameter of the high-pressure composite pipe is not strictly limited in the present invention. For example, the diameter may range widely from a relatively small diameter (10 mm to 30 mm in inner diameter) to a large diameter (300 mm to 500 mm). As for the inner layer pipe, the longitudinal sectional configuration and the circumferential sectional configuration are not particularly specified.

The description now turns to a method for manufacturing a high-pressure composite pipe according to the present invention.

The method of the present invention for manufacturing a high-pressure composite pipe is characterized in comprising the steps of: manufacturing an inner layer pipe made of a synthetic resin (the inner layer pipe manufacturing step); spirally winding a stretched polyolefin resin sheet on an external circumferential surface of the inner layer pipe (the winding step); filling the synthetic resin for the inner layer pipe, in a melted state, into a gap defined by the stretched polyolefin resin sheet which is wound on the external circumferential surface of the inner layer pipe, wherein the stretched polyolefin resin sheet is heated in the wound state so as to generate a shrinkage stress in the stretched polyolefin resin sheet (the synthetic resin filling step); and fusing the stretched polyolefin resin sheet and the inner layer pipe together (the sheet-inner layer pipe fusing step).

According to the method of the present invention for manufacturing a high-pressure composite pipe, a shrinkage stress, which is generated in the stretched polyolefin resin sheet in the wound state, produces a pressure by which the melted resin on the surface of the inner layer pipe is pressed toward the center of the inner layer pipe. In the meantime, the synthetic resin for the inner layer pipe can be filled, in a melted state, into the gap defined by the stretched polyolefin resin sheet. Thus, this method can manufacture a high-pressure composite pipe which avoids penetration of water from a cut surface of the pipe, and eventual weeping or fracture by blister.

The method of the present invention for manufacturing a high-pressure composite pipe may be conducted continuously or non-continuously (batch by batch). However, continuous manufacture results in a higher production efficiency.

Method for Continuous Manufacture of a High-pressure Composite Pipe

An example of a method for continuously manufacturing the high-pressure composite pipe may comprise the steps of: forming an inner layer pipe with the use of an extruder, a cooling tank with a forming part, and a haul off machine; spirally winding the stretched polyolefin resin sheet on an external circumferential surface of the inner layer pipe which is carried by the haul off machine, wherein the sheet is wound by means of a sheet winder equipped with a bobbin on which a predetermined length of the stretched polyolefin resin sheet is wound in advance; filling the resin for the inner layer pipe into a gap in the stretched polyolefin resin sheet in the wound state, wherein a heater is employed so as to take advantage of thermal expansion of the inner layer pipe as well as thermal contraction of the stretched polyolefin resin sheet.

The continuous manufacturing method of the high-pressure composite pipe is described step by step in further detail.

Inner Layer Pipe Manufacturing Step

To obtain an inner layer pipe, a synthetic resin is processed according to a general extrusion forming method, as utilized in the production of pipes and hoses. For a multi-layer inner layer pipe, a plurality of extruders and a multi-layered extrusion mold are employed.

Winding Step

While the stretched polyolefin resin sheet is wound, the inner layer pipe may be rotated or may not be rotated.

In a method where the inner layer pipe is rotated, either the stretched polyolefin resin sheet or the inner layer pipe is transferred in the longitudinal direction, while the inner layer pipe is rotated at a desired winding angle relative to the pipe. With the use of a machine which takes out the inner layer pipe while allowing its rotation, the stretched polyolefin resin sheet can be paid out and continuously wound in a spiral manner. However, as far as the inner layer pipe is rotated during the process, it is impossible to wind the sheets continuously and simultaneously at reverse angles about the axis of the pipe. Besides, this method is inefficient because such rotation have to be effected in the steps/apparatus on the upstream and the downstream as well.

On the other hand, in a method where the inner layer pipe is not rotated, a scroll (bobbin) of the stretched polyolefin resin sheet is positioned on an orbit around the inner layer pipe. The stretched polyolefin resin sheet is paid out from this scroll and wound by revolutions of the scroll. Continuous winding can be achieved by an apparatus which is capable of turning the scroll. The winding direction of the stretched polyolefin resin sheet can be changed by employing a winding machine which rotates in a different direction.

The stretched polyolefin resin sheet is wound in a spiral manner relative to the axis of the pipe. Preferably, the stretched polyolefin resin sheet is laminated in an even number of layers, with the winding angles being symmetrical about the pipe axis. Although the number of laminated layers may be an odd number, such odd-number laminated layers may possibly sacrifice the balance of the mechanical strength.

Preferably, the stretched polyolefin resin sheet is wound under a sufficient tension which at least prevents the sheet from sagging.

Preferably, when the stretched polyolefin resin sheet is wound, the widthwise ends of the sheet do not overlap on each other.

If the ends of the stretched polyolefin resin sheet are overlapped on each other, the resin for the inner layer pipe and the resin for the outer layer which are embedded in the heating step can fill only the gap between the inner layer pipe and the stretched polyolefin resin sheet contacting the inner layer pipe and the gap between the outer layer and the stretched polyolefin resin sheet contacting the outer layer. In such circumstances, the manufacturing process is complicated by the requirement of a synthetic resin layer for filling the gap defined between the sheet layers. For example, even when the sheet is wound in two layers only, a synthetic resin layer is necessary in order to fill a gap created between the first layer and the second layer.

In contrast, if the stretched polyolefin resin sheet is wound such that its ends do not overlap on each other, the sheet leaves a slight gap between its ends. Provided that the sheet is wound in two layers, a gap is defined in the sheet layer which lies on the inner layer pipe side, and this gap is filled with the resin for the inner layer pipe which exudes through the gap between the sheet ends. Likewise, another gap is defined in the sheet layer which lies on the outer layer side, and this gap is filled with the outer layer resin which exudes through the gap between the sheet ends. Accordingly, it is unnecessary to provide the above-mentioned synthetic resin layer for filling a gap between the sheet layers.

In addition, the sheet may be wound in three or more layers (e.g. four layers, six layers), in which each layer is formed alternately at different angles. Nevertheless, this structure requires a synthetic resin layer (a middle layer) to be laid after every two layers. As the synthetic resin layer, a heat-sealable resin film can be used to fill the gaps between the respective sheet layers.

Further, when the sheet is wound in three or more layers (e.g. four layers, six layers), gaps may be aligned by winding, for example, two or three layers at the same angle.

This structure allows the synthetic resin for the inner layer pipe (and the outer layer) to fill the gaps between the respective sheet layers.

The gap between adjacent turns of the stretched polyolefin resin sheet (the gap between the sheet ends) ranges preferably from 0.5 to 10.0 mm, more preferably from 1.0 to 5.0 mm. On the one hand, it may be difficult to securely fill a gap smaller than 0.5 mm with the resin for the inner layer pipe (a polyolefin resin) in a melted state, due to the surface tension of the resin which constitutes the stretched polyolefin resin sheet. On the other hand, a gap exceeding 10 mm may locally reduce the internal breaking pressure at an area devoid of the sheet (the gap area). In the latter case, the creeping property under internal water pressure may deteriorate in long-term use.

Synthetic Resin Filling Step and Sheet-Inner Layer Pipe Fusing Step

The stretched polyolefin resin sheet has its molecules oriented, after being stretched at a high ratio. Therefore, under heating, this sheet generates a shrinkage stress in the stretching direction. When this stress is generated in the sheet which is wound on the inner layer pipe, the inner layer pipe is squeezed by the sheet. At this stage, if the synthetic resin for the inner layer pipe (or for the synthetic resin layer between the sheet layers) is in a melted state, the synthetic resin is squeezed into the gap in the stretched polyolefin resin sheet and thus fills the gap in the stretched polyolefin resin sheet (the gap between the sheet ends).

If the stretched polyolefin resin sheet generates a high shrinkage stress under heating, the resin can be actually filled into the sheet gap without fail. At the same time, however, the inner layer pipe which also softens under heating may deform or diametrically contract to a critical extent. Keeping this possibility in mind, a preferable heating process is to melt no other area than where the inner layer pipe contacts the stretched polyolefin resin sheet (the vicinity of the surface of the inner layer pipe), with minimizing the softening of the entire inner layer pipe.

Some examples can be mentioned as this heating process. Firstly, the infrared heating can be applied by using a heat source which produces a range of high temperatures such that the stretched polyolefin resin sheet is not caused to melt. This heat source is set to complete the heating of the resin for filling the sheet gap, before the temperature on the internal side of the inner layer pipe reaches its softening point. Secondly, the softening of the inner layer pipe can be prevented by cooling the internal side of the inner layer pipe, while heating the external side (the side on which the stretched polyolefin resin sheet is wound). In addition, since the highly stretched polyolefin resin sheet is transparent, it is possible to utilize a heat source which produces such wavelengths as to be absorbed relatively less in the stretched polyolefin resin sheet but to be absorbed in large volumes in the synthetic resin for filling the sheet gap.

The synthetic resin filling step and the sheet-inner layer pipe fusing step may be performed separately or simultaneously. Whichever operation can be suitably selected, depending on the balance between the temperature required to fill the synthetic resin into the sheet gap and the temperature for fusing the stretched polyolefin resin sheet to the inner layer pipe. That being said, simultaneous operation is more efficient.

For the purpose of fusing the stretched polyolefin resin sheet and filling it into the gap, the heating may be applied after each layer is wound, or only once altogether. Where the sheet is thick or wound in multiple layers, the heating is preferably applied after the winding of each layer, in order that relaxation is not generated in the stretched polyolefin resin sheet by heating.

In such heating processes, the item can be carried through an infrared furnace or a hot air furnace. With respect to the near-infrared heating in the infrared furnace, the item can be heated quickly and efficiently, owing to heat-transfer heating by the radiation heat of a light source as well as photoheating from the light source.

In the case of the infrared heating, it is desirable to add an infrared-absorptive pigment or dye to the outermost layer of the inner layer pipe, so that photoheating from the light source can be efficiently transferred to the inner layer pipe. The preferable pigment includes black pigments (carbon black), and the preferable dye includes phthalocyanine dyes.

The pigment or dye can be added in suitable parts, considering the formability and the cost. As for the forming, if the forming is conducted at a low temperature range in which the temperature remains stable during the heating, it is possible to suppress variations of the outer diameter of the high-pressure composite pipe and to achieve energy saving.

Incidentally, before the winding of the stretched polyolefin resin sheet, the inner layer pipe may be pre-heated to a fusible temperature, or the stretched polyolefin resin sheet may be preheated. In the case where the stretched polyolefin resin sheet is pre-heated, the winding tension directly serves as a pressing means. Further, additional pressure may be applied by a support roll or the like, when the stretched polyolefin resin sheet is brought into contact with the inner layer.

Moreover, the heat applied during the coating of the outer layer may be utilized not only to coat the outer layer but also to integrate (fuse) the inner layer pipe with the stretched polyolefin resin sheet, at the same time.

Method for Non-continuous Manufacture of a High-pressure Composite Pipe

A method for non-continuously manufacturing the high-pressure composite pipe is mentioned below.

In advance, an inner layer pipe is prepared to a standard length by extrusion forming or the like. A stretched polyolefin resin sheet is wound on the external circumferential surface of this inner layer pipe, and heated for a predetermined time in a furnace which is capable of applying even heating in the circumferential direction of the pipe. Thereby, the stretched polyolefin resin sheet is fused with the inner layer pipe.

Similar to the previous method, the stretched polyolefin resin sheet can be wound by paying out the stretched polyolefin resin sheet, with rotating the inner layer pipe. The sheet can be easily wound at reverse angles about the pipe axis by reversing the direction of rotation.

The applicable heating means is the same as those utilized for the continuous manufacture. As mentioned earlier, in the continuous manufacture of the high-pressure composite pipe, the inner layer pipe should be heated evenly in the circumferential direction of the pipe. On the other hand, in the non-continuous manufacture, it is not essential to provide the heat source evenly in the circumferential direction of the pipe, because the inner layer pipe can be heated evenly in the circumferential direction of the pipe by rotating the inner layer pipe during the heating.

In the non-continuous manufacturing method, the outer layer can be laminated in the same manner as in the continuous manufacture.

The following description gives further details of the method for manufacturing a high-pressure composite pipe according to the present invention.

In the method of the present invention for manufacturing a high-pressure composite pipe, a surface pressure may be applied to a surface of the stretched polyolefin resin sheet, while the stretched polyolefin resin sheet is heated in the wound state. Thereby, the synthetic resin for the inner layer pipe is filled, in a melted state, into the gap defined by the stretched polyolefin resin sheet, and the stretched polyolefin resin sheet and the inner layer pipe are fused together.

In the winding/heating step of this method, a surface pressure is applied to the surface of the stretched polyolefin resin sheet, in addition to the shrinkage stress of the stretched polyolefin resin sheet. This combination strengthen the pressure by which the melted resin on the surface of the inner layer pipe surface is pressed toward the center of the inner layer pipe. Thus, the resin for the inner layer pipe can be filled into the sheet gap (the gap between the sheet ends) without fail. As a result, this method extends the range of forming conditions (e.g. types of synthetic resins for the inner layer pipe, melting viscosity of such resins, required temperature range) This method is effective when the synthetic resin has a relatively low viscosity, or when the resin for filling the sheet gap cannot be heated sufficiently, because of the balance between the melting temperatures of the stretched polyolefin resin sheet and the inner layer pipe.

While the stretched polyolefin resin sheet is heated in the wound state, a surface pressure can be applied to its surface by pressing the surface with a roll which is rounded along the outer diameter of the pipe, or by pulling the pipe through a die or shoe which is set slightly smaller than the outer pipe diameter. It is also possible to use a device which presses a roll against the sheet gap, while rotating at the same rotation speed as the sheet winder.

In the method of the present invention for manufacturing a high-pressure composite pipe, the synthetic resin for the outer layer may be coated on the stretched polyolefin resin sheet which is wound on the external circumferential surface of the inner layer pipe. The outer layer resin is coated in a melted state, with a surface pressure applied to the laminated surface. Thereby, the synthetic resin for the outer layer is filled into the gap defined by the stretched polyolefin resin sheet, and the stretched polyolefin resin sheet and the outer layer are fused together.

This method, which provides an outer layer, also avoids penetration of water from a cut surface of the pipe, and eventual weeping and fracture by blister.

The best way to coat the outer layer is an extrusion coating method using an extruder and a crosshead die. Although the outer layer may be coated by winding a synthetic resin sheet preformed in a predetermined thickness and heating the same thereafter, this process is laborious.

The surface pressure applied to the laminated surface, which serves to fill the outer layer resin into the sheet gap, can be applied in the following manner. For example, in the extrusion coating using a crosshead die, the tip of a die lip is provided with a parallel portion which is parallel to the pipe surface. Assuming that a substantial passageway extends between the parallel portion at the die lip and the pipe surface, the outer layer resin is coated under surface pressure. In this method, if the parallel portion at the die lip is too long, the laminated surface of the pipe is subjected to an excessive pressure, which causes such problems as fracture or melting of the inner layer pipe or the sheet. Therefore, the parallel portion at the die lip needs to be set properly, depending on the coating temperature and viscosity of the outer layer resin.

In the method of the present invention for manufacturing a high-pressure composite pipe the synthetic resin for the outer layer may be coated on the stretched polyolefin resin sheet which is wound on the external circumferential surface of the inner layer pipe, and the pressure may be reduced between a surface on which the outer layer is coated and an internal surface of the outer layer.

According to this method, the pressure is reduced between the surface on which the outer layer is coated and the internal surface of the outer layer, during the coating of the outer layer. Hence, this method can avoid inclusion of voids, so that the synthetic resin for the outer layer can fill the gap in the stretched polyolefin resin sheet without fail. Besides, this method extends the range of forming conditions (e.g. types of synthetic resins for the outer layer, melting viscosity of such resins, required temperature range).

While the outer layer is coated, the pressure between the surface on which the outer layer is coated and the internal surface of the outer layer can be reduced in the following manner. Regarding the above-mentioned extrusion coating method using a crosshead die, the coating mold is sealed with a rubber packing or the like so as to create a space in which the pressure can be reduced. This space is depressurized by means of a vacuum pump. By eliminating the air which exists between the resin extruded from the die lip and the surface on which the outer layer is to be coated, this method can prevent generation of voids and other defects due to remaining air.

If the outer layer is coated in a depressurized condition, a suitable MI for the synthetic resin is in the range of 0.5 to 2.0 g/10 min.

In the method of the present invention for manufacturing a high-pressure composite pipe, an outer layer may be coated in a melted state, and a surface pressure may be applied to an external surface of the outer layer before it solidifies. Thereby, the synthetic resin for the outer layer is filled, in a melted state, into the gap in the stretched polyolefin resin sheet, and the stretched polyolefin resin sheet and the outer layer are fused together.

This method gives a surface pressure to the external surface of the coated outer layer before it solidifies. As a consequence, the synthetic resin for the outer layer can securely fill the gap defined between the sheet ends.

In order to apply a surface pressure to the external surface of the coated outer layer before it solidifies, the above-mentioned manners can be utilized. Namely, the surface may be pressed with a roll which is rounded along the outer diameter of the pipe, or the pipe may be pulled through a die or shoe which is set slightly smaller than the outer pipe diameter. It is also possible to use a device which presses a roll against the sheet gap, while rotating at the same rotation speed as the sheet winder. Any of these manners is performed immediately after the coating of the melted resin.

In the method of the present invention for manufacturing a high-pressure composite pipe, an outer layer may be coated in a melted state, and a surface pressure may be applied to an external surface of the coated outer layer before it solidifies, by contacting an outer diameter restriction mold or jig against the external surface. In addition, a cooling operation may be combined while the outer diameter is restricted by the mold or jig. According to this method, the synthetic resin for the outer layer can fill the gap in the stretched polyolefin resin sheet, uniformly in the circumferential direction of the pipe. Moreover, owing to the combination of the outer diameter restriction and the cooling, the resulting high-pressure composite pipe takes on a good appearance.

In an exemplary manner of applying a surface pressure to the surface of the coated outer layer before it solidifies, the surface may be brought into contact with a mold or a jig (e.g. a shoe) whose inner diameter is defined along or slightly smaller than the outer diameter of the laminated pipe. This manner can apply a surface pressure to the laminated surface uniformly and simultaneously in the circumferential direction of the pipe. Besides, owing to the combination of the outer diameter restriction and the cooling, it is possible to secure the state where the sheet gap is filled with the resin, and, at the same time, to give a good appearance.

Specifically, the restriction of the outer diameter and the cooling can be effected in various manners. For one, a sizing method may be carried out, as usually performed in extrusion forming. For another, a tubular mold may be installed at the entry of a spray tank and cooled therein by spraying. Further regarding the tubular mold, a cooling medium may be circulated through its cooling piping system, so that the cooled tubular mold can serve to form and cool the melted synthetic resin.

The above manners for the outer diameter restriction and the cooling are not usually adopted in the process of extrusion-coating a synthetic resin on the surface of a metal pipe or the like. This is because the above-mentioned manners impair the production stability, unless the synthetic resin is introduced in between the forming/cooling mold and the metal pipe with extreme precision. Nevertheless, those manners are applicable to the present invention, because the inner layer pipe and the reinforcing layer, both made of synthetic resins, show moderate flexibility.

If the surface pressure is applied to the surface during the lamination of the outer layer, it is preferable to use a synthetic resin with a MI of about 0.04 to 10 g/10 min.

Now, according to the method of the present invention for manufacturing a high-pressure composite pipe, the shrinkage stress of the stretched polyolefin resin sheet is utilized to fill the synthetic resin into a gap on the inner layer pipe side, among the gaps defined by the stretched polyolefin resin sheet. As mentioned before, however, since the inner layer pipe also softens under heating, the inner layer pipe may deform or diametrically contract to a critical extent.

For prevention of such problems, it is effective to place a core (e.g. tubular or spherical mandrel) inside the inner layer pipe, with respect to the step where the shrinkage stress is generated in the stretched polyolefin resin sheet under heating.

The shrinkage stress of the stretched polyolefin resin sheet produces a stress which is directed from the pipe surface toward the axial center.

With the use of the mandrel, this stress is not absorbed by deformation of the inner layer pipe, but acts on the melted synthetic resin in the vicinity of the surface of the inner layer pipe. Eventually, the resin can fill the sheet gap without fail.

The mandrel is a member which prevents critical deformation of the inner layer pipe, against the shrinkage stress of the stretched polyolefin resin sheet. For example, the mandrel may be a cylindrical, conical or spherical member made of metal, FRP, rigid plastic or the like. It is also possible to use a flexible, high-strength pouch-shaped member which is made of a reinforced rubber or a laminate of a rubber and a woven fiber/cloth. This pouch-shaped member is arranged to transform along the internal surface of the inner layer pipe, on application of water pressure, oil pressure, air pressure and the like.

The mandrel may be cooled or controlled at certain temperatures by means of water, oil, air, etc. In the manufacture process where the mandrel is cooled or controlled at certain temperatures, the resin in the vicinity of the inner layer pipe surface (the resin to be filled into the gap in the stretched polyolefin resin sheet) can be heated into a melted state, whereas the internal side of the inner layer pipe is protected from deformation.

To employ the mandrel in the continuous manufacturing process of the high-pressure composite pipe, the inner layer pipe needs to be transferred along the mandrel, while the inner layer pipe tends to contract diametrically under the shrinkage stress. In view of this requirement, it is preferable to smooth the surface of the mandrel, thereby decreasing the contact resistance between the inner layer pipe and the mandrel.

Concerning the continuous manufacturing process of the high-pressure composite pipe, the mandrel can be placed inside the inner layer pipe by linking the mandrel, with the use of a wire or chain, to an inner core mold of a pipe die which is used for the manufacture of the inner layer pipe.

Additionally, the mandrel may be composed of an endless steel belt which is wound spirally, with each end overlapped on the other.

BEST MODE FOR CARRYING OUT THE INVENTION

Embodiments of the present invention are hereinafter described with reference to the drawings.

Figure 1:
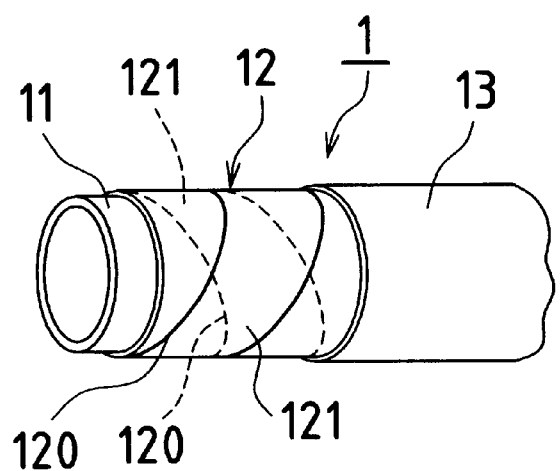
FIG. 1 is a perspective view of an embodiment of the high-pressure composite pipe according to the present invention.
Figure 2:
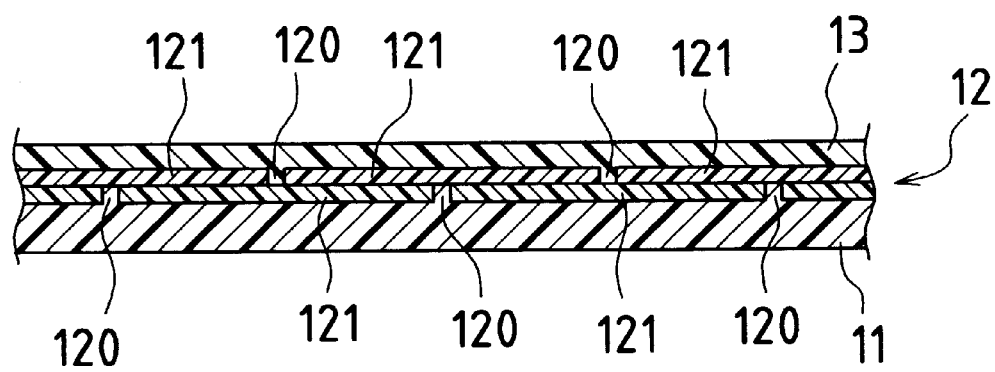
FIG. 2 is a vertical cross section showing a main part of this embodiment of the high-pressure composite pipe according to the present invention.

FIG. 1 is a perspective view of an embodiment of the high-pressure composite pipe according to the present invention. FIG. 2 is a vertical cross section showing a main part of this embodiment.

In this embodiment, a high-pressure composite pipe 1 is composed of a polyethylene inner layer pipe 11, a reinforcing layer 12 which is formed by spirally winding a crosslinked, stretched polyethylene sheet 121 on the external circumferential surface of the inner layer pipe 11, and a polyethylene outer layer 13 which is laminated on the reinforcing layer 12.

The reinforcing layer 12 laminated on the inner layer pipe 11 has a two-layer structure. In other words, a layer of the crosslinked, stretched polyethylene sheet 121, which is prepared in the form of a strip with a suitable width, is wound spirally at an inclination angle of 30 to 90 degrees (preferably 45 to 70 degrees) relative to the axis of the inner layer pipe 11. On top of this, another layer of the crosslinked, stretched polyethylene sheet 121 is spirally wound at a reverse inclination angle.

The high-pressure composite pipe 1 of this embodiment is characterized in the following respects. First of all, the inner layer pipe 11 and the crosslinked, stretched polyethylene sheet 121 are integrated by thermofusion, and the crosslinked, stretched polyethylene sheet 121 and the outer layer 13 are integrated likewise. Besides, referring to FIG. 2, a spiral gap 120 is defined by the crosslinked, stretched polyethylene sheet 121 (between its widthwise ends) which lies on the top of the inner layer pipe 11, and the gap 120 is filled with the synthetic resin for the inner layer pipe 121 (a polyethylene). In addition, another spiral gap 120 is defined by the crosslinked, stretched polyethylene sheet 121 (between its width-wise ends) which lies below the outer layer 13, and this gap 120 is filled with the synthetic resin for the outer layer 13 (a polyethylene).

As for the high-pressure composite pipe 1 of this structure, the reinforcing layer 12 is laminated on the polyethylene inner layer pipe 11 by spirally winding the crosslinked, stretched polyethylene sheet 121 having an excellent tensile strength. Thus, the inner layer pipe 11 is reinforced by the reinforcing layer 12. The resulting high-pressure composite pipe 1 shows an excellent pressure resistance, eliminating the fear of damage even when high-pressure fluid may flow inside the inner layer pipe 11.

Moreover, the spiral gaps 120 defined by the crosslinked, stretched polyethylene sheet 121 are filled with the synthetic resins for the inner layer pipe 11 and the outer layer 13 (polyethylenes), respectively. This structure avoids penetration of water from pipe ends through between the inner layer pipe 11 and the reinforcing layer 12 and between the reinforcing layer 12 and the outer layer 13, thus eliminating the fear of weeping or fracture by blister.

Figure 3:
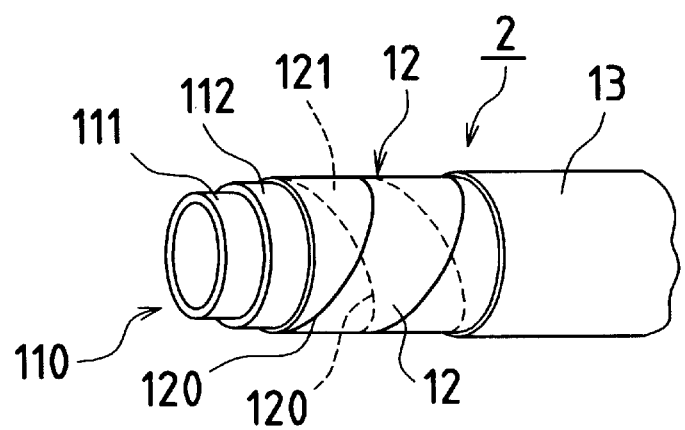
FIG. 3 is a perspective view of a different embodiment of the high-pressure composite pipe according to the present invention.
Figure 4:
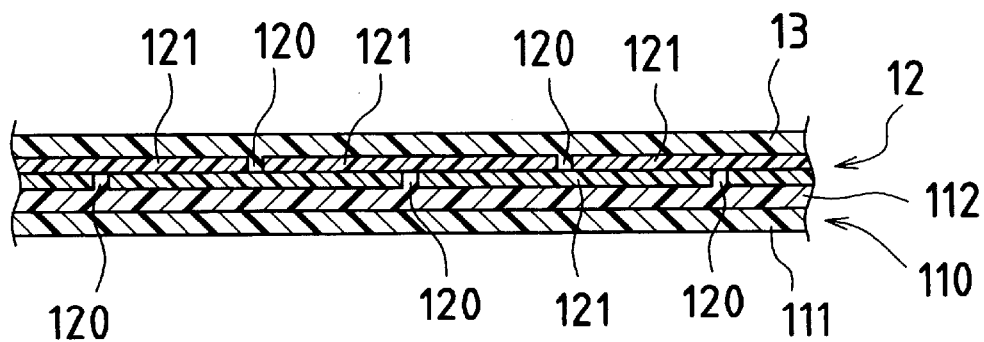
FIG. 4 is a vertical cross section showing a main part of the different embodiment of the high-pressure composite pipe according to the present invention.

FIG. 3 is a perspective view of a different embodiment of the high-pressure composite pipe according to the present invention. FIG. 4 is a vertical cross section showing a main part of this embodiment.

A high-pressure composite pipe 2 of this embodiment is characterized in that the inner layer pipe 110 is composed of two layers, namely, a polyethylene innermost layer 111 and a polyethylene outermost layer 112. The other structures are the same as those of the high-pressure composite pipe 1 shown in FIG. 1 and FIG. 2.

In the high-pressure composite pipe 2 of this embodiment, a spiral gap 120 is defined by the crosslinked, stretched polyethylene sheet 121 (between its widthwise ends) which lies on the top of the double inner layer pipe 110, and the gap 120 is filled with the synthetic resin for the outermost layer 112 of the inner layer pipe 110 (a polyethylene). In addition, another spiral gap 120 is defined by the crosslinked, stretched polyethylene sheet 121 (between its width-wise ends) which lies below the outer layer 13, and this gap 120 is filled with the synthetic resin for the outer layer 13 (a polyethylene). Therefore, this embodiment also avoids penetration of water from pipe ends through between the inner layer pipe 110 and the reinforcing layer 12 and between the reinforcing layer 12 and the outer layer 13, thus eliminating the fear of weeping or fracture by blister.

Figure 5:
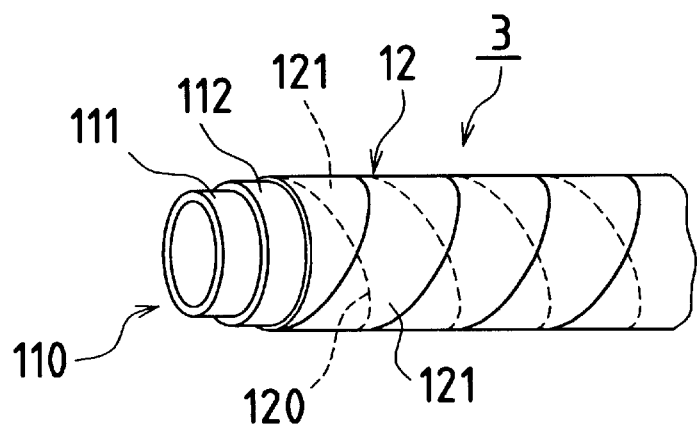
FIG. 5 is a perspective view of a further embodiment of the high-pressure composite pipe according to the present invention.
Figure 6:
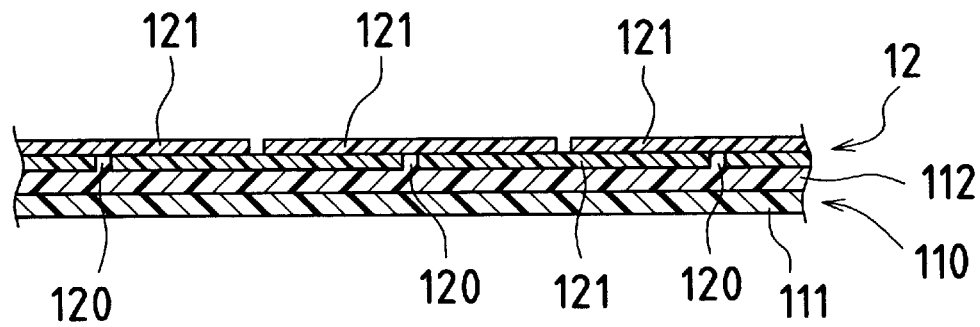
FIG. 6 is a vertical cross section showing a main part of the further embodiment of the high-pressure composite pipe according to the present invention.

FIG. 5 is a perspective view of a further embodiment of the high-pressure composite pipe according to the present invention. FIG. 6 is a vertical cross section showing a main part of this embodiment.

A high-pressure composite pipe 3 of this embodiment is the same as the high-pressure composite pipe 2 illustrated in FIG. 3 and FIG. 4, except for omitting the lamination of the outer layer 13.

In the high-pressure composite pipe 3 of this embodiment, a gap 120 is defined by the crosslinked, stretched polyethylene sheet 121 (between its width-wise ends) which lies on the top of the double inner layer pipe 110, and the gap 120 is filled with the resin for the outermost layer 112 of the inner layer pipe 110 (a polyethylene). Accordingly, this embodiment also avoids penetration of water from pipe ends through between the inner layer pipe 110 and the reinforcing layer 12, thus eliminating the fear of weeping or fracture by blister.

The present invention is further described by way of Examples and Comparative Example.

Example 1

Manufacture of a Reinforcing Layer Sheet

Figure 7:
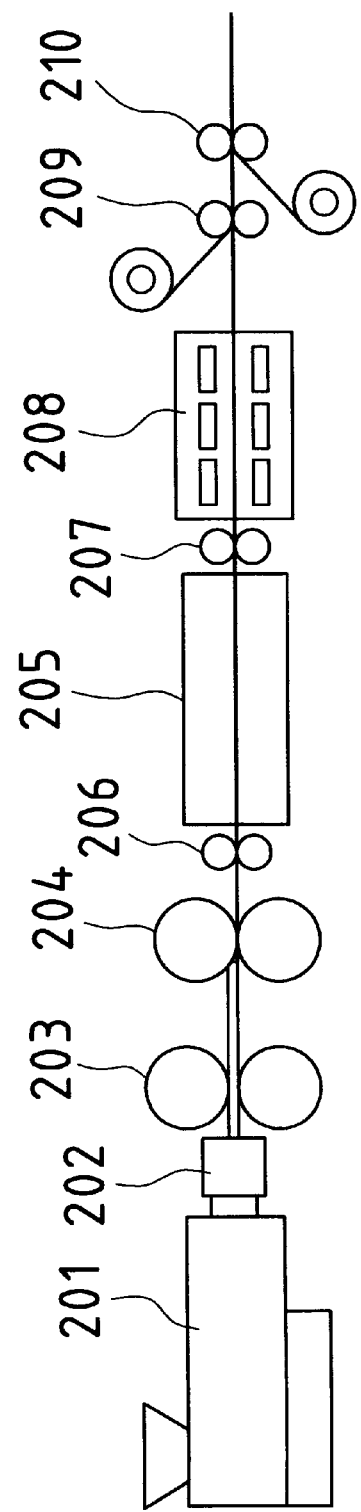
FIG. 7 schematically shows the general construction of a manufacturing machine which is used for the manufacture of a reinforcing sheet in Examples (Comparative Example) of the present invention.

As the polyolefin for constituting the stretched polyolefin resin sheet, a high-density polyethylene (melting point: 135° C., MI=1 g/10 min) was employed. The sheet was manufactured by the manufacturing machine illustrated in FIG. 7.

While the high-density polyethylene was kneaded at 200° C. in a co-rotating twin-screw extruder 201, 1.2 parts by weight (relative to the high-density polyethylene) of triallyl isocyanurate as a cross-linking aid and 0.6 part by weight of benzophenone as a photoinitiator were fed and evenly kneaded into the high-density polyethylene. The mixture was extruded from a T-die 202 and formed by rollers 203 to give a 3-mm-thick polyethylene sheet.

This polyethylene sheet was paid out at a speed of 1 m/min, and rolled at 1000% through rolls 204 whose temperature was regulated at 125° C. (speed: 10 m/min). The sheet was further transferred through a heating furnace 205 at 120° C. and hauled up at a speed of 20 m/min, so as to be stretched at 200%. The resulting stretched polyethylene sheet, stretched at 2000% in total, had a thickness of 0.15 mm. The payout and haul-off operations were conducted by pinch rolls 206, 207.

For the crosslinking, the stretched poly-ethylene sheet was subjected to ten seconds of irradiation under a high-pressure mercury lamp, with the use of an irradiator 208. Thus obtained was a crosslinked, stretched polyethylene sheet.

On both surfaces of this crosslinked, stretched polyethylene sheet, adhesive films (heat-sealable resin films) were laminated.

As the adhesive films, a linear low-density polyethylene (melting point: 123° C., MI=0.8 g/10 min) was formed in a thickness of 0.03 mm by inflation forming. The adhesive films were continuously laminated on the crosslinked, stretched polyethylene sheet, thereby giving a crosslinked, stretched polyethylene composite sheet (thickness: 0.21 mm) to be used for winding.

To laminate the adhesive films, the crosslinked, stretched polyolefin sheet and the adhesive films were pulled through pairs of pinch rolls 209, 210 at a speed of 20 m/min. For this operation, either pair of the pinch rolls 209, 210 were controlled at 200° C. and the other pair were controlled at 50° C.

Figure 8:
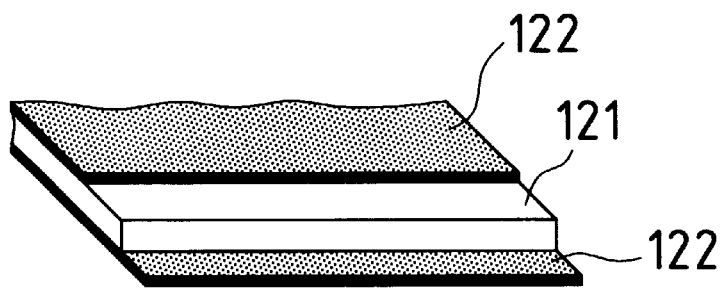
FIG. 8 is a perspective view showing the structure of a stretched polyethylene sheet which is laminated with adhesive films.

FIG. 8 represents the sectional structure of this crosslinked, stretched polyolefin composite sheet. In the composite sheet of FIG. 8, adhesive films 122, 122 are laminated on both surfaces of the crosslinked, stretched polyethylene sheet 121.

For measurement of the tensile stress (equal to the shrinkage stress), the crosslinked, stretched polyolefin composite sheet was fixed on a tensile tester and heated to 130° C. The sheet showed a tensile stress of about 8 MPa. In addition, the crosslinked, stretched polyolefin composite sheet was immersed in xylene at 125° C. for 24 hours, in order to obtain the weight ratio of the residual matter/the sheet before immersion. This weight ratio, which indicated the ratio of crosslinking (equal to gel fraction), was 40%.

Manufacture of a High-pressure Composite Pipe

Figure 9:
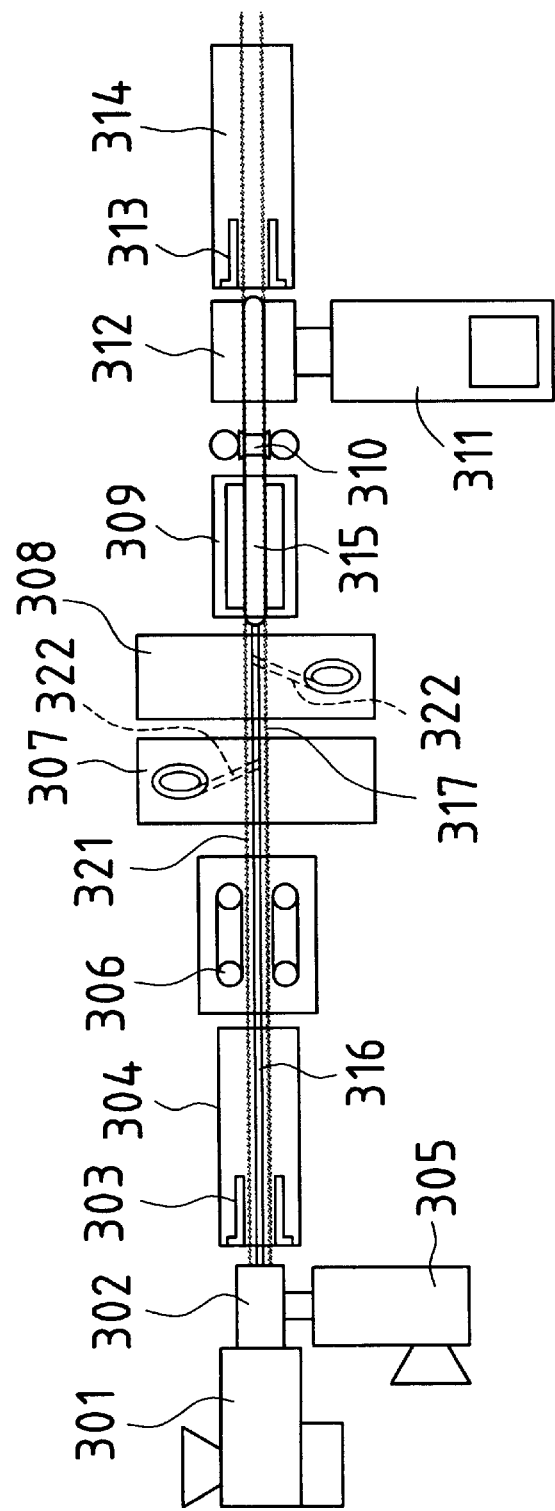
FIG. 9 schematically shows the general construction of a manufacturing machine which is used for the manufacture of a high-pressure composite pipe in Examples (Comparative Example) of the present invention.

FIG. 9 shows a machine for manufacturing the high-pressure composite pipe used in Example 1.

The manufacturing machine illustrated in FIG. 9 is equipped with a single-screw extruder 301, a pipe extrusion mold 302 provided at the end of the single-screw extruder 301, a cooling mold 303, a low-pressure cooling tank 304, a haul off machine 306, a pair of spiral winders 307, 308, an infrared furnace 309, four concave rolls 310 which are rounded along the outer pipe diameter, an outer layer coating mold 312 connected to a single-screw extruder 311, a cooling mold 313, a cooling tank 314, etc.

The manufacturing machine of FIG. 9 is also provided with a secondary single-screw extruder 305 which is connected to the pipe extrusion mold 302. If another kind of resin is extruded from the secondary single-screw extruder 305, the inner layer pipe can be extrusion-formed in two layers. It should be noted, however, Example 1 produced a single inner layer pipe, without adopting the extrusion by the secondary single-screw extruder 305.

The next description relates to a specific manufacture process.

Using the manufacturing machine of FIG. 9, a high-density polyethylene (melting point: 135° C., MI=0.5 g/10 min) was fed into the single-screw extruder 301. By means of the pipe extrusion mold 302 provided at its end, the cooling mold 303, the low-pressure cooling tank 304 and the haul off machine 306, the resin was formed into an inner layer pipe 321 (outer diameter: 110 mm, wall thickness: 4 mm). Following that, two strips of a reinforcing layer sheet 322 were prepared by slitting the crosslinked, stretched polyolefin composite sheet into a width of 60 mm each. With the use of a pair of spiral winders 307, 308, these strips were wound on the inner layer pipe 321 alternately, at an angle of about ±80 degrees relative to the axis of the pipe. The winding was carried out in such a manner as to leave a gap of 1 mm between the widthwise ends of the sheet.

Next, the sheet-wound inner layer pipe 321 was heated to a surface temperature of 130° C. in the infrared furnace 309, thereby fusing the reinforcing layer sheet 322 to the inner layer pipe 321. During this step, the heated pipe was subjected to surface pressure from four directions, which was given by the four concave rolls 310 located at the exit of the infrared furnace 309. Through this step, the resin for the inner layer pipe was filled into the gap defined by the sheet which lay on the top of the inner layer pipe 321 (the gap between the sheet ends).

Then, a high-density polyethylene (melting point: 135° C., MI=0.5 g/10 min) was extrusion-coated by using the outer layer coating mold 312 which was connected to the single-screw extruder 311. In this coating process, the coated wall was given a thickness of 1.6 mm, and the resin temperature was kept at 180° C.

Figure 10:
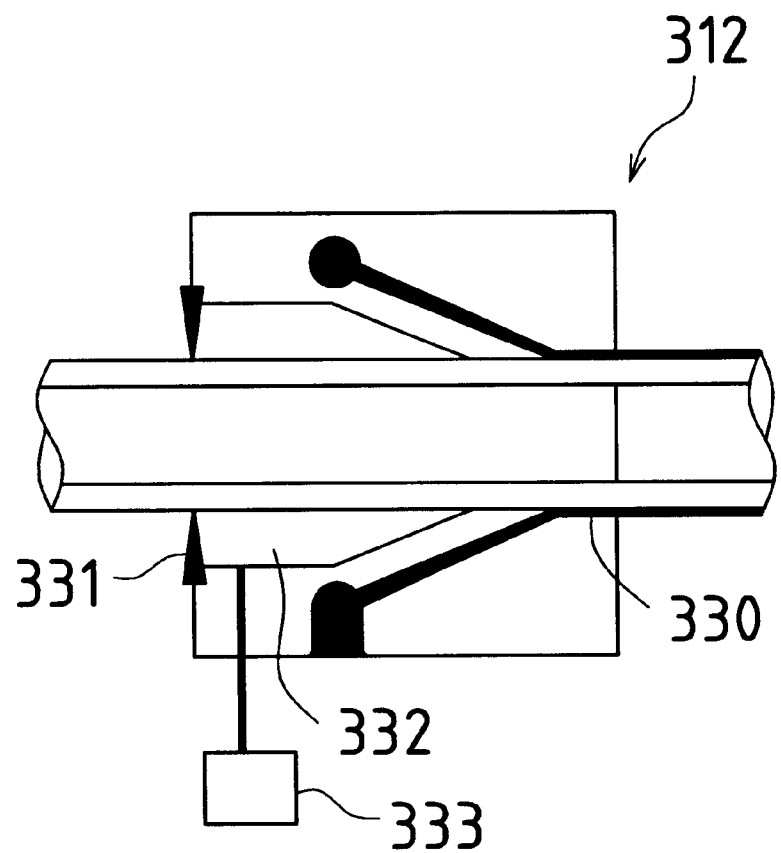
FIG. 10 schematically shows the structure of an outer layer coating mold which is employed in the manufacturing machine of FIG. 9.

As illustrated in FIG. 10, the outer layer coating mold 312 had a parallel portion 330 at the end of the mold. Coating was applied by extruding the resin in between the parallel portion 330 and the pipe, so that the outer layer resin was filled into the outer sheet gap (the gap between the sheet ends). On the upstream of the outer layer coating mold 312, a packing 331 is mounted in contact with the external circumferential surface of the pipe before coating. The packing and the external surface of the pipe defined a cavity 332 inside the mold. During the coating of the melted resin, the cavity 332 was depressurized by a vacuum pump 333.

In the course of the above manufacturing method, from the heating step in the infrared furnace 309 until the outer layer coating step using the outer layer coating mold 312, a metal mandrel 315 was placed inside the inner layer pipe 321. The mandrel 315 was cylindrical in shape, and had an outer diameter which conformed to the inner diameter of the inner layer pipe. The mandrel 315 was linked to the pipe extrusion mold 302 by a chain 316. For circulation of a cooling medium, a hose 317 was arranged along the chain 316. By circulating temperature-controlled water through the cooling medium circulation hose 317, the external surface of the mandrel 315 was regulated at a temperature of 60° C.

In the next stage, the pipe having an unsolidified outer layer was inserted along and into the cooling mold 313 (the mold whose inner diameter was equal to that of the parallel portion 330 in the outer layer coating mold 312) which was provided at the head of the cooling tank 314. The cooling mold 313 was cooled with water sprayed within the cooling tank 314. While the outer layer was kept in contact with the cooling mold 313, under uniform surface pressure in the circumferential direction, the outer layer and the whole pipe were cooled to give the high-pressure composite pipe 1 shown in FIG. 1 and FIG. 2.

With regard to the high-pressure composite pipe obtained in Example 1, the resin for the inner layer pipe was filled into the gap in the crosslinked, stretched polyethylene sheet which lay on the top of the inner layer pipe. At the same time, the resin for the outer layer was filled into the gap in the crosslinked, stretched polyethylene sheet which lay below the outer layer.

Example 2

Manufacture of a Reinforcing Layer Sheet

A reinforcing layer sheet (a crosslinked, stretched polyolefin composite sheet) was prepared in the same manner as in Example 1.

Manufacture of a High-pressure Composite Pipe

Referring to the process for manufacturing the inner layer pipe in Example 1, a linear low-density polyethylene (melting point: 120° C., MI=4.0 g/10 min) was extruded from the secondary single-screw extruder 305. The thus obtained inner layer pipe had a double structure composed of a main layer of the high-density polyethylene and a 0.2-mm-thick second inner layer (an outermost layer) which was laid externally of the main layer.

In the subsequent steps, the process of Example 1 was generally followed to manufacture a high-pressure composite pipe as shown in FIG. 3 and FIG. 4. It should be noted, however, that the mandrel 315 was not placed inside the inner layer pipe, and that surface pressure was not applied by the concave rolls 310 which located at the exit of the infrared furnace With regard to the high-pressure composite pipe obtained in Example 2, the resin for the outermost layer of the double inner layer pipe was filled into the gap in the crosslinked, stretched polyethylene sheet which lay on the top of the inner layer pipe. At the same time, the resin for the outer layer was filled into the gap in the stretched polyethylene sheet which lay below the outer layer.

Example 3

Manufacture of a Reinforcing Layer Sheet

A reinforcing layer sheet (a crosslinked, stretched polyolefin composite sheet) was prepared in the same manner as in Example 1.

Manufacture of a High-pressure Composite Pipe

Referring to the process for manufacturing the inner layer pipe in Example 1, another high-density polyethylene (melting point: 135° C., MI=4.0 g/10 min) was extruded from the secondary single-screw extruder 305. The thus obtained inner layer pipe had a double structure composed of a main layer of the earlier-mentioned high-density polyethylene and a 0.2-mm-thick second inner layer (an outermost layer) which was laid externally of the main layer.

In the subsequent steps, the process of Example 1 was generally followed to manufacture a high-pressure composite pipe as shown in FIG. 3 and FIG. 4. It should be noted, however, that the mandrel 315 was not placed inside the inner layer pipe, and that surface pressure was not applied by the concave rolls 310 which located at the exit of the infrared furnace 309.

With regard to the high-pressure composite pipe obtained in Example 3, the resin for the outermost layer of the double inner layer pipe was filled into the gap in the crosslinked, stretched polyethylene sheet which lay on the top of the inner layer pipe. At the same time, the resin for the outer layer was filled into the gap in the stretched polyethylene sheet which lay below the outer layer.

Example 4

Manufacture of a Reinforcing Layer Sheet

A reinforcing layer sheet (a crosslinked, stretched polyolefin composite sheet) was prepared in the same manner as in Example 1.

Manufacture of a High-pressure Composite Pipe

Referring to the process for manufacturing the inner layer pipe in Example 1, a linear low-density polyethylene (melting point: 125° C., MI=1.0 g/10 min) was extruded from the secondary single-screw extruder 305. The thus obtained inner layer pipe had a double structure composed of a main layer of the high-density polyethylene and a 0.2-mm-thick second inner layer (an outermost layer) which was laid externally of the main layer.

In the subsequent steps, the process of Example 1 was generally followed to manufacture a high-pressure composite pipe as shown in FIG. 3 and FIG. 4. It should be noted, however, that the mandrel 315 was not placed inside the inner layer pipe.

With regard to the high-pressure composite pipe obtained in Example 4, the resin for the outermost layer of the double inner layer pipe was filled into the gap in the crosslinked, stretched polyethylene sheet which lay on the top of the inner layer pipe. At the same time, the resin for the outer layer was filled into the gap in the stretched polyethylene sheet which lay below the outer layer.

Example 5

Manufacture of a Reinforcing Layer Sheet

A reinforcing layer sheet (a crosslinked, stretched polyolefin composite sheet) was prepared in the same manner as in Example 1, and cured in an oven at 120° C. for six hours. The cured sheet showed a shrinkage stress of 3 MPa, as measured under the same condition as in Example 1.

Manufacture of a High-pressure Composite Pipe

The process of Example 1 was followed to manufacture a high-pressure composite pipe as shown in FIG. 1 and FIG. 2, except that the crosslinked, stretched polyolefin composite sheet had been cured.

With regard to the resulting high-pressure composite pipe, the resin for the inner layer pipe was filled into the gap in the crosslinked, stretched polyethylene sheet which lay on the top of the inner layer pipe. At the same time, the resin for the outer layer was filled into the gap in the crosslinked, stretched polyethylene sheet which lay below the outer layer.

Example 6

Manufacture of a Reinforcing Layer Sheet

A reinforcing layer sheet (a crosslinked, stretched polyolefin composite sheet) was prepared in the same manner as in Example 1.

Manufacture of High Pressure Composite Pipe

In this Example, the pipe was introduced into the cooling tank 314 and cooled by sprayed water, without the coating of an outer layer. Except for this, the process of Example 2 was followed to manufacture a high-pressure composite pipe as shown in FIG. 5 and FIG. 6.

With regard to the resulting high-pressure composite pipe, the resin for the outermost layer of the double inner layer pipe was filled into the gap in the crosslinked, stretched polyethylene sheet which lay on the top of the inner layer pipe.

Example 7

Manufacture of a Reinforcing Layer Sheet

A stretched polyethylene composite sheet was obtained in the same manner as in Example 1, except for omitting the irradiation under a high-pressure mercury lamp by the irradiator 208. The gel fraction of the sheet was 0%, as measured in the same manner as in Example 1.

Manufacture of High Pressure Composite Pipe

In this Example, the pipe was introduced into the cooling tank 314 and cooled by sprayed water, without the coating of an outer layer. Except for this, the process of Example 2 was followed to manufacture a high-pressure composite pipe as shown in FIG. 5 and FIG. 6.

With regard to the resulting high-pressure composite pipe, the resin for the outermost layer of the double inner layer pipe was filled into the gap in the crosslinked, stretched polyethylene sheet which lay on the top of the inner layer pipe.

Example 8

Manufacture of a Reinforcing Layer Sheet

The process of Example 1 was followed, except that the adhesive films (the heat-sealable resin films) were made of a low-density polyethylene (melting point: 106° C., MI=2 g/10 min) and extrusion-formed in a thickness of 0.09 mm.

Manufacture of a High-pressure Composite Pipe

A high-pressure composite pipe was manufactured as in Example 1. With regard to the resulting high-pressure composite pipe, the resin for the adhesive films (the heat-sealable resin) was filled into the gap in the crosslinked, stretched polyethylene sheet which lay on the top of the inner layer, and also into the gap in the crosslinked, stretched polyethylene sheet which lay below the outer layer.

Comparative Example 1

Referring to Example 1, the manufacturing conditions for the manufacture of a high-pressure composite pipe were changed in such a manner as to give a high-pressure composite pipe in which the gap in the crosslinked, stretched polyethylene sheet was not filled with a resin.

Pipe Performance Evaluation Test

For the high-pressure composite pipes obtained in Examples 1–8 and Comparative Example 1, the long-term performance was assessed by the creep test under internal pressure. Also observed was the state of water penetration from the pipe ends.

Figure 11:
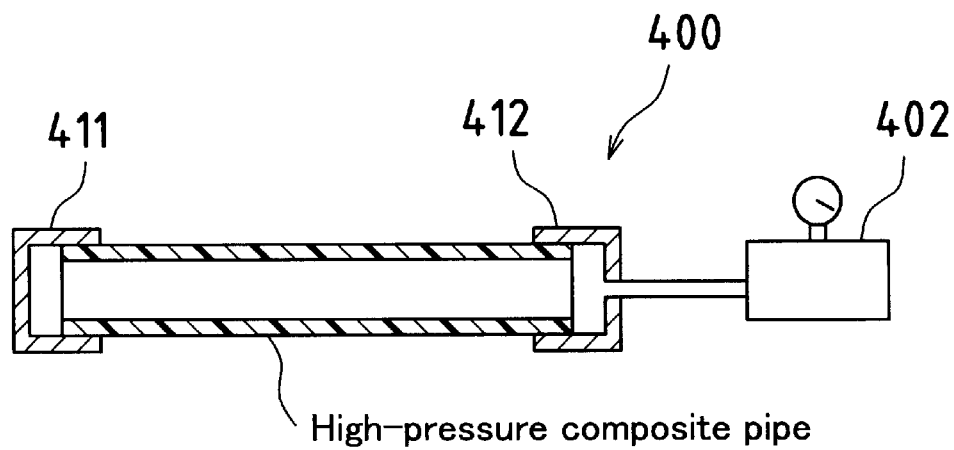
FIG. 11 schematically shows the general construction of a measuring instrument which is used in the performance evaluation test for the high-pressure composite pipes obtained in Examples (Comparative Example) of the present invention.
Figure 12:
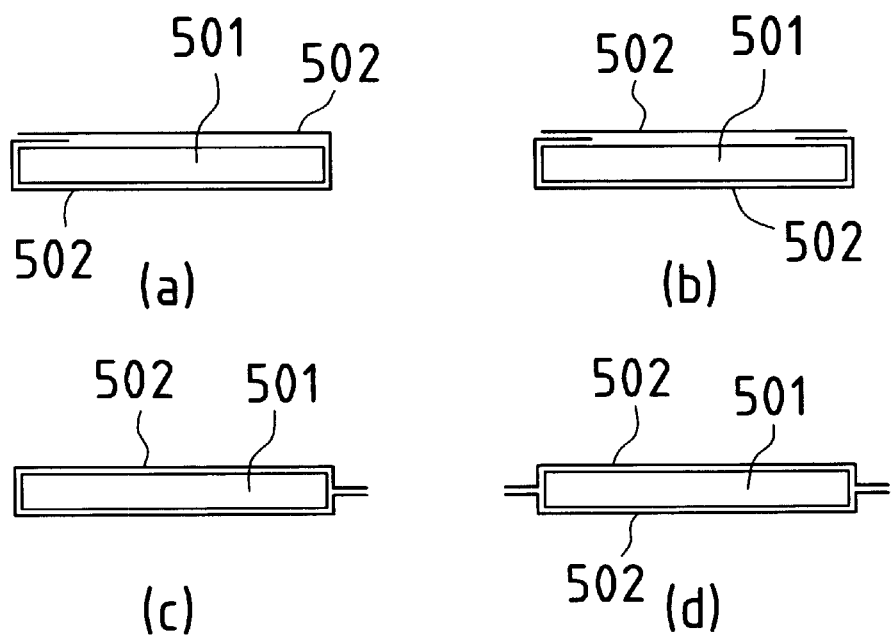
FIG. 12 schematically shows the structure of stretched polyolefin resin sheets, each of which is laminated with heat-sealable resin films.

To be specific, a measuring instrument used for the test is illustrated in FIG. 11. This measuring instrument 400 was equipped with assessment jigs 411, 412 and a water-pressure pump 402. For each pipe, the retention duration against the pressure was measured in an environment at 30° C. and by means of 30° C. water while an internal pressure of 2.744 MPa was continuously applied to each high-pressure composite pipe.

In the measurement illustrated in FIG. 11, water pressure was imposed on ends of the high-pressure composite pipe. When the stretched polyethylene sheet had a gap, water penetrated along the spiral path. The water caused weeping in the outer layer and eventual fracture. On the other hand, where no gap was left in the stretched polyethylene sheet (where a resin filled the gap in the sheet), it was observed that fracture originated in the internal side of the inner layer pipe.

The evaluation results are compiled in Table 1 below.

TABLE 1

| | Retention Time Against Internal Pressure | State of Pipe Fracture |
|---|---|---|
| Example 1 | about 500 hrs. | Fracture originated in the internal side of the inner layer pipe. |
| Example 2 | about 500 hrs. | Fracture originated in the internal side of the inner layer pipe. |
| Example 3 | about 500 hrs. | Fracture originated in the internal side of the inner layer pipe. |
| Example 4 | about 500 hrs. | Fracture originated in the internal side of the inner layer pipe. |
| Example 5 | about 450 hrs. | Fracture originated in the internal side of the inner layer pipe. |
| Example 6 | about 450 hrs. | Fracture originated in the internal side of the inner layer pipe. |
| Example 7 | about 300 hrs. | Fracture originated in the internal side of the inner layer pipe. |
| Example 8 | about 500 hrs. | Fracture originated in the internal side of the inner layer pipe |
| Comp. Ex. 1 | about 0.2 hr. | No fracture developed on the internal side of the inner layer pipe. Weeping was observed in the outer layer. |

INDUSTRIAL APPLICABILITY

As described above, the high-pressure composite pipe of the present invention avoids penetration of water from a cut surface of the pipe, and hence eliminates the fear of weeping or fracture by blister. Consequently, this pipe is useful for a piping system in various applications. Further, the method of the present invention for manufacturing a high-pressure composite pipe is effective for the manufacture of a high-pressure composite pipe in which weeping and fracture by blister are prevented without fail.

What is claimed is:

1. A high-pressure composite pipe characterized in comprising an inner layer pipe made of a synthetic resin, and a reinforcing layer formed by spirally winding a stretched polyolefin resin sheet on an external circumferential surface of the inner layer pipe, wherein the synthetic resin for the inner layer pipe is filled into a gap defined by the stretched polyolefin resin sheet which is wound on the external circumferential surface of the inner layer pipe.

2. A high-pressure composite pipe according to claim 1, characterized in:

that the inner layer pipe is composed of a plurality of synthetic resin layers; and that a synthetic resin for. at least an outermost layer of the inner layer pipe is filled into the gap in the stretched polyolefin resin sheet.

3. A high-pressure composite pipe according to claim 1 or 2, characterized in:

that the inner layer pipe is composed of a plurality of synthetic resin layers; and that, with respect to the synthetic resin layers, a synthetic resin for at least an outermost layer has a melt index of 2 g/10 min or greater.

4. A high-pressure composite pipe according to claim 2, characterized in:

that the inner layer pipe is composed of a plurality of synthetic resin layers; and that, with respect to the synthetic resin layers, a melting point of a synthetic resin for at least an outermost layer is lower than that of at least one of the synthetic resins for the other layer or layers, with a difference of these melting points being 5° C. or greater.

5. A high-pressure composite pipe according to claim 1, characterized in that the stretched polyolefin resin sheet which constitutes the reinforcing layer shows a shrinkage stress of 4.9 MPa or greater, when heated.

6. A high-pressure composite pipe characterized in comprising an inner layer pipe made of a synthetic resin, and a reinforcing layer formed by spirally winding a stretched polyolefin resin sheet on an external circumferential surface of the inner layer pipe, wherein a heat-sealable resin is filled into a gap defined by the stretched polyolefin resin sheet which is wound on the external circumferential surface of the inner layer pipe.

7. A high-pressure composite pipe according to claim 1 or 6, characterized in:
that an outer layer made of a synthetic resin is laminated on an external circumferential surface of the reinforcing layer; and
that the synthetic resin for the outer layer is filled into a gap defined by the stretched polyolefin resin sheet which lies below the outer layer.

8. high-pressure composite pipe according to claim 1 or 6, characterized in that the stretched polyolefin resin sheet is crosslinked.

9. A method for manufacturing a high-pressure composite pipe, characterized in comprising the steps of:
manufacturing an inner layer pipe made of a synthetic resin;
spirally winding a stretched polyolefin resin sheet on an external circumferential surface of the inner layer pipe;
filling the synthetic resin for the inner layer pipe, in a melted state, into a gap defined by the stretched polyolefin resin sheet which is wound on the external circumferential surface of the inner layer pipe, wherein the stretched polyolefin resin sheet is heated in the wound state so as to generate a shrinkage stress in the stretched polyolefin resin sheet; and
fusing the stretched polyolefin resin sheet and the inner layer pipe together.

10. A method for manufacturing a high-pressure composite pipe according to claim 9, characterized in applying a surface pressure to a surface of the stretched polyolefin resin sheet, while the stretched polyolefin resin sheet is heated in the wound state,
whereby the synthetic resin for the inner layer pipe is filled, in a melted state, into a gap defined by the stretched polyolefin resin sheet, and the stretched polyolefin resin sheet and the inner layer pipe are fused together.

11. A method for manufacturing a high-pressure composite pipe according to claim 9, characterized in coating a synthetic resin for an outer layer on the stretched polyolefin resin sheet which is wound on the external circumferential surface of the inner layer pipe, the synthetic resin being coated in a melted state, with a surface pressure applied to the laminated surface,
whereby the synthetic resin for the outer layer is filled into a gap defined by the stretched polyolefin resin sheet, and the stretched polyolefin resin sheet and the outer layer are fused together.

12. A method for manufacturing a high-pressure composite pipe according to any of claims 9 to 11, characterized in:
coating a synthetic resin for an outer layer on the stretched polyolefin resin sheet which is wound on the external circumferential surface of the inner layer pipe; and
reducing the pressure between the surface on which the outer layer is coated and an internal surface of the outer layer.

13. A method for manufacturing a high-pressure composite pipe according to any of claims 9 to 11, characterized in:
coating an outer layer in a melted state; and
applying a surface pressure to an external surface of the coated outer layer, before it solidifies,
whereby a synthetic resin for the outer layer is filled, in a melted state, into a gap defined by the stretched polyolefin resin sheet, and the stretched polyolefin resin sheet and the outer layer are fused together.

14. A method for manufacturing a high-pressure composite pipe according to claim 13, characterized in:
coating an outer layer in a melted state;
applying a surface pressure to an external surface of the coated outer layer, before it solidifies, wherein the surface pressure is applied to the laminated surface by contacting an outer diameter restriction mold or jig against the external surface; and
carrying out a cooling operation, with the outer diameter being restricted by the mold or jig.

15. A method for manufacturing a high-pressure composite pipe according to any of claims 9 to 11, characterized in that a member for keeping an inner diameter is placed inside the inner layer pipe, with respect to the step where the stretched polyolefin resin sheet is heated so as to generate a shrinkage stress in the sheet.

* * * * *